United States Patent [19]
Pace

[11] 3,780,712
[45] Dec. 25, 1973

[54] MARINE ENGINE COOLING

[75] Inventor: John G. Pace, Port Huron, Mich.

[73] Assignee: Chrysler Corporation, Highland Park, Mich.

[22] Filed: Nov. 13, 1972

[21] Appl. No.: 306,247

Related U.S. Application Data

[62] Division of Ser. No. 127,489, March 24, 1971, Pat. No. 3,734,170.

[52] U.S. Cl............ 123/41.08, 123/41.31, 60/321, 165/51, 165/100
[51] Int. Cl........ F28f 27/02, F01n 3/04, F01p 3/12
[58] Field of Search.................... 60/320, 321; 123/41.02, 41.08, 41.09, 41.31; 165/51, 100, 108

[56] References Cited
UNITED STATES PATENTS

| | | | |
|---|---|---|---|
| 1,361,033 | 12/1920 | Ericson | 123/41.31 X |
| 1,974,907 | 9/1934 | Worth | 123/41.09 UX |
| 2,060,187 | 11/1936 | Fernstrum | 60/321 |
| 2,080,600 | 5/1937 | Bremer | 123/41.09 |
| 2,284,381 | 5/1942 | DuPont | 123/41.08 X |
| 2,327,342 | 8/1943 | Drapeau | 123/41.09 |
| 2,478,489 | 8/1949 | Kelson, Sr. | 123/41.08 |
| 2,757,650 | 8/1956 | Holley | 60/320 X |
| 3,283,498 | 11/1966 | Connell | 60/321 X |
| 3,358,654 | 12/1967 | Shanahan et al. | 60/321 X |
| 3,319,614 | 5/1967 | Shanahan | 123/41.08 |
| 3,380,466 | 4/1968 | Sarra | 123/41.09 X |
| 3,485,040 | 12/1969 | Niskanen | 60/321 X |
| 3,696,620 | 10/1972 | Pace | 60/321 |

Primary Examiner—Al Lawrence Smith
Attorney—Oliver F. Arrett

[57] ABSTRACT

Improved water jacketed manifolds for marine engine cooling systems of the type wherein heated water which has circulated through an engine cooling system for cooling purpose is mixed in the improved engine exhaust manifold water jacket according to this invention with raw, relatively cool water to controllably cool the manifold and avoid condensing water from the exhaust gases flowing through the exhaust manifold.

3 Claims, 7 Drawing Figures

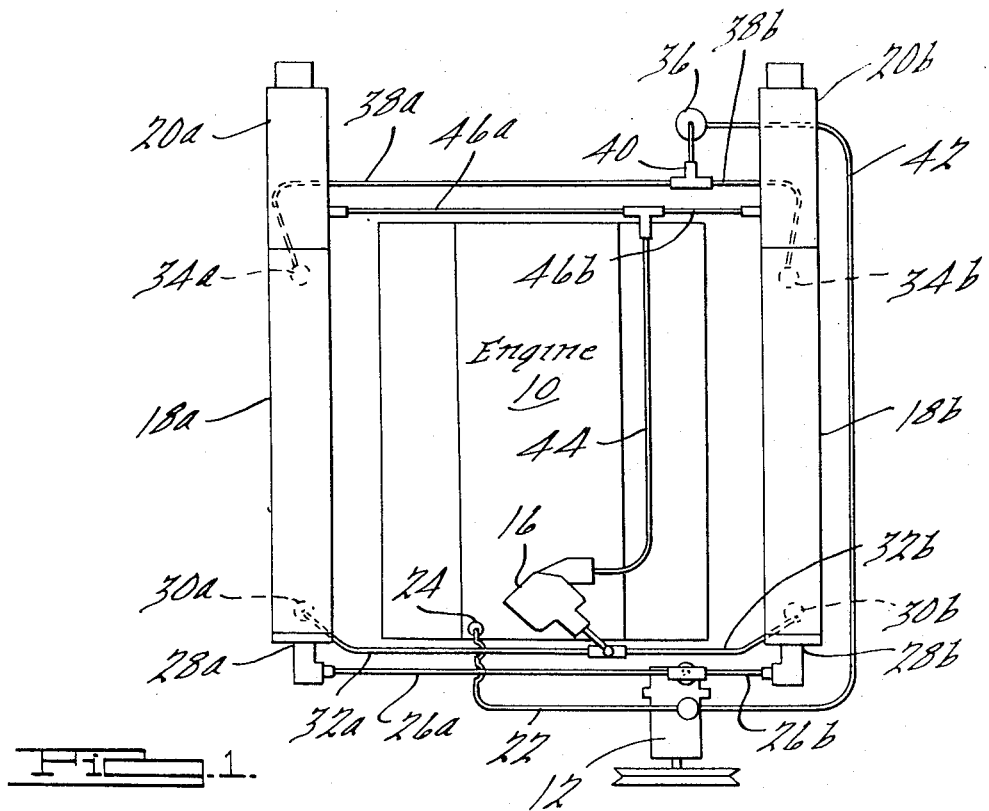
Fig. 1.
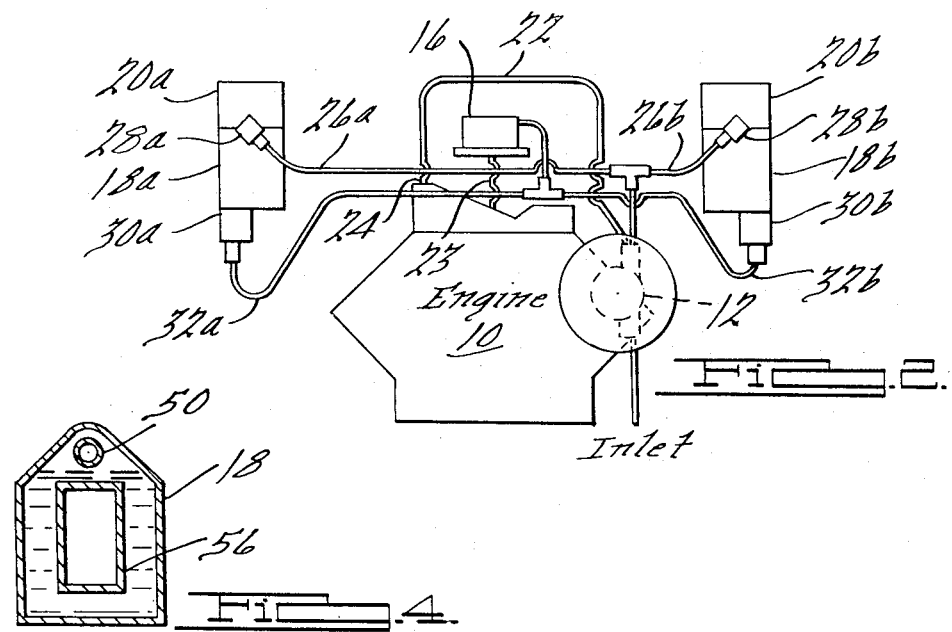
Fig. 2.
Fig. 4.

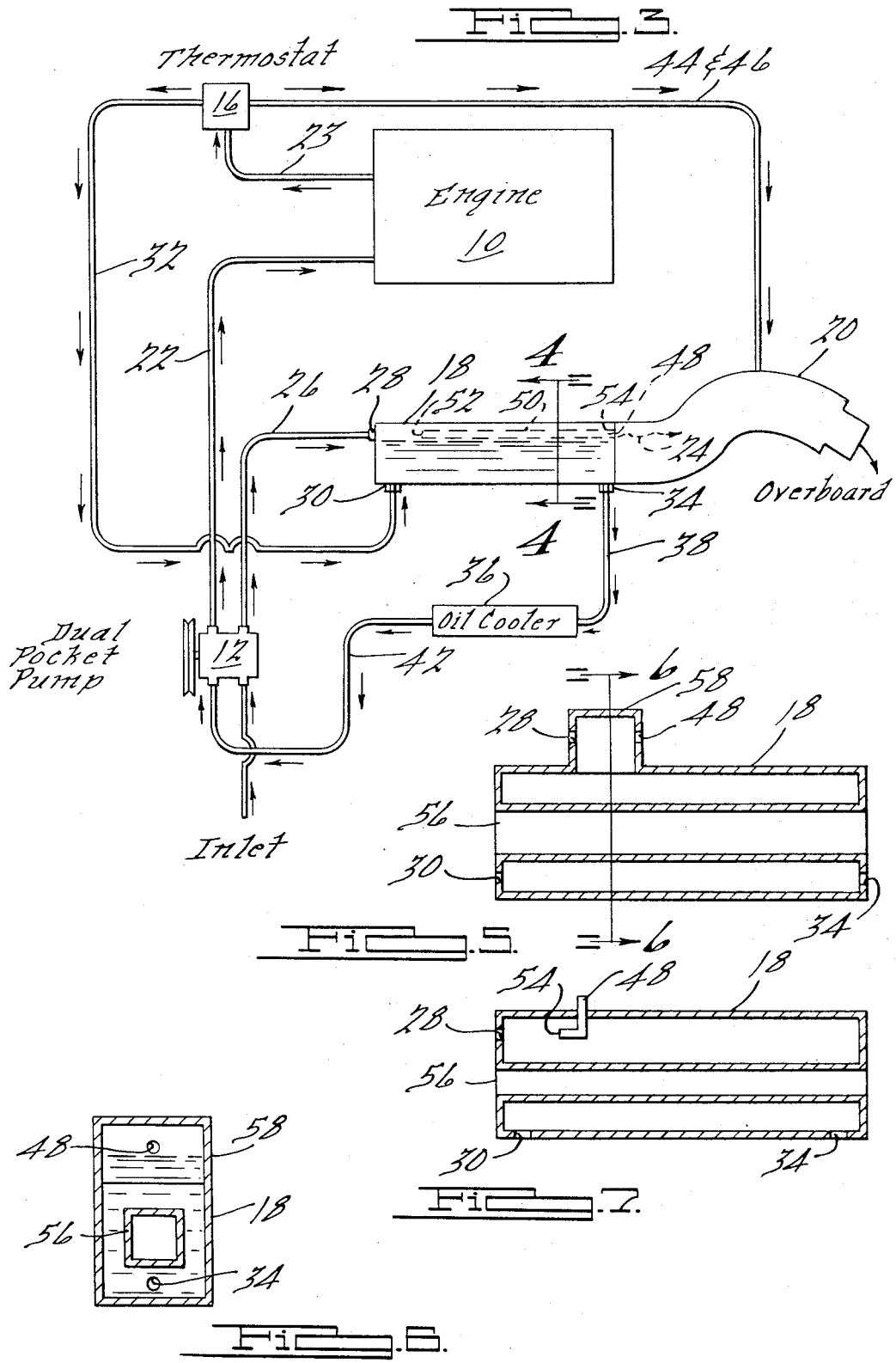

MARINE ENGINE COOLING

This is a division of application Ser. No. 127,489 filed Mar. 24, 1971 now U. S. Pat. No. 3,734,170.

BACKGROUND OF THE INVENTION

This invention relates to improved raw water cooling systems for marine engines and particularly to improved water jacketed exhaust manifolds therefor. The term "raw water" as used herein is meant to refer to water which has been freshly pumped into but not circulated through the engine cooling system and has therefore not absorbed any heat from the various engine components. Heretofore, raw water was pumped through engine cooling systems wherein water circulation was controlled by a thermostatic valve. The valve dumped some water from the system when the water reached a predetermined temperature and allowed raw, relatively cool water to be added to the system to replace the dumped water and lower the temperature of the water flowing through the system. Various arrangements have been used to cool the engine manifolds, such as circulating raw water therethrough and even pre-mixing raw water with some of the heated water from the cooling system.

Such systems have tended under certain weather conditions, such as those prevalent in early Spring and late Fall when raw water is particularly cool, to overcool the manifolds and cause condensation of water from the exhaust gases to occur in the manifolds. The condensate tended to drain back into the engine with undesirable effects. To meet this problem the prior art has for example, used separate mixing chambers wherein heated circulating water and raw water have been mixed together prior to circulation through the manifold water jackets. However, such arrangements have been overly complicated from the standpoint of the exterior hose arrangement required on the engines. It is an object of this invention to prevent such condensation by providing a cooling system with anticondensation features in the engine manifold water jackets wherein mixing or tempering of the raw water occurs in the jacket by means of special structure. This, in addition to other advantages, makes less complicated exterior plumbing or hose arrangements possible on the engine.

It is a general object of this invention to circulate both raw water and heated water from the engine cooling system through marine engine exhaust manifold jackets, allowing the raw and heated water to mix to varying degrees in the jacket, depending on the demands of the system, thus limiting the temperature to which the manifold is cooled. It may also be said that it is an object of this invention to provide a controlled temperature for marine engine exhaust manifolds which avoids exhaust condensation and also allows the manifold water jacekt to serve as a point at which the cooling system replenishes dumped water with raw water.

SUMMARY OF THE INVENTION

This invention comprises marine engine water jacketed exhaust manifolds having ordinary water inlet and outlet arrangements for circulating the engine cooling water through the water jacket. The invention also comprises cooling systems utilizing these manifolds. A jacketed manifold according to this invention will include a raw water inlet and outlet adapted for allowing the flow of raw water through the jacket and wherein the raw water outlet will be mutually arranged relative to each other to provide a preferred flow or path for the raw water through the jacket with minimal mixing between it and the circulating heated water in the jacket which comes from the engine cooling system. Minimal mixing is maintained except for times when the circulating water requires additional raw water to replace water which has been dumped from the cooling system. In a preferred embodiment this is accomplished by structure comprising a tube which is positioned longitudinally in the manifold water jacket. The tube includes an inlet end spaced a short distance from the raw water inlet on the manifold jacket to provide a gap therebetween which functions as a means for introducing raw water into the circulating water of the cooling system proper. The tube also includes an outlet end which is connected to the outlet on the manifold water jacket.

When heated water, which has flowed through the engine cooling system, is introduced into the manifold water jacket, water tends to fill the jacket to the level at which the tube is positioned therein. This water tends to flow out of the usual manifold jacket outlet at the other end thereof and is then circulated through the engine cooling system. Raw water entering the raw water inlet of the manifold jacket tends to flow across the gap into the tube inlet and out the raw water outlet so long as the manifold jacket proper is substantially full of water from the engine cooling system. When, however, water from the cooling system has been dumped due to an increase in the temperature thereof, the volume of the water in the manifold jacket proper decreases correspondingly. Some of the raw cool water flowing across the gap into the inlet tube then tends to fall down into the manifold jacket proper and mix with the water from the engine cooling system. The water which has been dumped is thus replaced by the mixing action in the manifold jacket. This mixing action occurs until the engine cooling system pump has been satisfied as to the volume of water required to fill the cooling system and provide the proper cooling function at which time the exhaust manifold water jacket is again substantially full of water from the engine cooling system and most of the raw water flowing through the raw water inlet again bridges the gap and preferentially flows through the tube and out of the raw water outlet to be dumped or otherwise disposed of rather than mixing in the jacket. Structural arrangements other than the tube and gap may be used to accomplish these ends as will be indicated hereinbelow.

BRIEF DESCRIPTION OF THE DRAWING

FIG. 1 is a schematic top elevation, with certain parts disassembled or exploded, of a V-8 marine engine having a raw water cooling system according to the present invention.

FIG. 2 is a front elevation of the engine shown in FIG. 1.

FIG. 3 is a schematic diagram of a preferred raw water cooling system according to the present invention.

FIG. 4 is a cross-section through line 3—3 of FIG. 2 showing typical manifold structure for marine engines.

FIGS. 5 and 6 are cross-sectional representations of another embodiment of the invention.

FIG. 7 is a cross-sectional representation of yet another embodiment of the invention.

DESCRIPTION OF THE PREFERRED EMBODIMENTS

A marine engine generally designated at 10 is shown in FIGS. 1 and 2. The engine is equipped with a raw water cooling system according to the present invention. The cooling system includes a water pump means 12, a thermostatic valve 16, water jacketed exhaust manifolds 18a and 18b, terminating in exhaust elbows 20a and 20b, and appropriate conduit means such as interior passages in the engine block per se and exterior lines, such as rubber hoses, for interconnecting these elements to provide water circulation therebetween.

Pump means 12 may be a dual pocket pump. This type of pump is capable of providing two flow outputs in different paths simultaneously. As can be seen in FIGS. 1 and 2, pump 12 provides flow outputs of water taken in at an inlet line 22 which leads to the internal portion of the engine cooling system at 24 and into lines 26a and 26b which lead to inlets 28a and of the water jackets for manifolds 18.

Line 22 serves as the beginning for the engine cooling system proper. As previously indicated it conducts water from pump 12 to the interior circulating system of engine 10. Water flows from engine 10 to thermostatic valve 16 through line 23 (shown in FIG. 2). When thermostatic valve 16 is closed, that is when the circulating water is below a predetermined temperature, water will flow from it to inlets 30a and 30b through lines 32a and 32b, respectively to enter the water jackets of the manifolds.

Due to internal structure in the manifold jacket, which will be described in detail hereinbelow, water entering inlets 30a and 30b will for the most part leave the jackets through outlets 34a and 34b (shown in FIG. 1) respectively whereas water entering inlets 28a and 28b will for the most part leave the jackets by flowing directly therefrom into the exhaust elbows where it will mix with the exhaust gases. Water may be conducted from outlets 34a and 34b to an oil cooler 36 by lines 38a and 38b and Tee 40 (shown in FIG. 1). From the oil cooler, water flows back to the front pocket of pump 12 by means of line 42 (shown in FIG. 1).

When thermostatic valve 16 opens, that is when the temperature of the circulating water substantially reaches the predetermined temperature, some of the circulating water in the cooling system is dumped via line 44 and lines 46a and 46b into exhaust elbows 20a and 20b where the water mixes with the exhaust gases and is discharged therewith through the engine exhaust system.

Referring now to FIG. 3, a raw water cooling system according to the present invention is shown in a somewhat diagrammatic fashion for clarity and convenience in order to describe the improved water jacket structure according to this invention and the operation of the overall system. As in all the Figures, similar elements are identified by the same numbers throughout the drawings. The arrows in the Figure indicate flow paths through the various elements of the system. The system is comprised of cooling lines interconnecting pump 12 and engine 10 via line 22, engine 10 and thermostatic valve 16, via line 23, thermostatic valve 16 and exhaust manifold water jacket 18 at inlet 30 via line 32, and water jacket 18 at outlet 34 to pump means 12 via line 38, oil cooler 36 and line 42. Water circulates through this part of the system cooling the engine and the exhaust manifold. When the water exceeds a certain predetermined temperature, such as 140° to 170°F. For example, thermostatic valve 16 dumps some water overboard by means of lines 44 and 46 which lead to exhaust elbow 20, as previously noted. Although certain of the elements described may actually be present in pairs, such as the manifolds 18a and 18b and the like, only one of each has been shown in FIG. 3 for simplicity and identified by the number only, such as manifold 18.

Raw water flows through line 26 which extends from pump means 12 to the exhaust manifold jacket 18 by means of which cool raw water may flow to the jacket inlet 28. An outlet 48 (shown in FIG. 3) at the opposite end of the exhaust manifold jacket, communicates with exhaust elbow 20 for dumping water entering at inlet 28.

In operation, when thermostatic valve 16 is closed and water is flowing through the engine cooling system, water will flow through the exhaust manifold jacket by entering inlet 30 and substantially fill the manifold jacket, as indicated in the drawing wherein the water level is almost to the top of the jacket. The water will then flow out of outlet 34 at the other end of the exhaust manifold jacket to continue circulatory flow to the pump and again be circulated through the engine 10 and so on. When thermostatic valve 16 opens due to increased water temperature and dumps some of the heated water from the system through lines 44 and 46, the dumped water must be replaced by an additional amount of cool raw water. This is provided by means of the preferred arrangement which is shown in the exhaust manifold jacket 18 of FIG. 3. As can best be seen in that Figure and in FIG. 4, the exhaust manifold water jacket 18 includes a tube, such as brass tube 50, which is positioned in the upper portion of the jacket with an inlet end 52 maintained at a predetermined distance from raw water inlet 28 on water jacket 18. There is thus provided a gap between inlet 28 and the inlet end 52 of tube 50 which water must traverse in order to enter the tube. The outlet end 54 of tube 50 is connected to jacket raw water outlet 48 as shown at the opposite end of the exhaust manifold jacket.

Thus, when thermostatic valve 16 is closed and the cooling system has substantially filled exhaust manifold jacket 18 with circulating water, raw cooling water flowing through line 26 will tend to traverse the gap with minimal mixing with the circulating water in the jacket, enter tube 50 and flow out the outlet end to be dumped overboard through exhaust elbow 20 and the engine exhaust system. However, when thermostatic valve 16 opens to dump water through lines 44 and 46, the volume of water and the water level in the exhaust manifold jacket will fall to a lower level and some of the raw water entering the jacket through line 26, which has heretofore traversed the gap and entered tube 50, will fall into the lower main body portion of the exhaust manifold jacket to mix with the water contained therein. It will then flow through outlet 34 to circulate through the engine cooling system proper. The mixing action of the raw cool water and the heated circulating water thus provided controls the temperature of the exhaust manifolds to prevent exhaust gas condensation therein and also provides additional cooling water for the engine cooling system to replace that which has been dumped overboard by thermostatic valve 16. The pumping demands placed upon the water in exhaust manifold jacket 18 by pump 13 will inherently provide mixing of raw cool water with previously circulated water in the manifold jacket to control the exhaust manifold to a desired temperature range and to regulate the mixing requiremenet of the water in the cooling system. Mixing will also be in part controlled by the degree of the thermostat opening when water is being dumped.

Exhaust manifold water jacket 18 has been shown somewhat diagrammatically but it is to be understood that the preferred structure is of the standard type, which is well known in the art. FIG. 4 shows such a type having a central conduit or manifold 56 for exhaust gases surrounded by jacket 18 through which the water may flow for cooling the manifold and the gases. In the upper portion, tube 50 is preferably positioned as shown.

It can be seen that according to this invention and particularly in the preferred arrangement wherein tube 50 has an inlet 52 in the proximity of raw water inlet 28, a path is provided, through the tube in the preferred embodiment, which the raw water prefers when the jacket is substantially full of circulating water. When water is dumped from the cooling system, the preferred path is disturbed and the raw water tends to mix in relatively large amounts with the circulating water in the jacket until the balance of the system restores itself.

Only a preferred structure has been described in detail but others are possible wherein a raw water inlet and outlet are arranged close to each other in an upper portion of a water jacketed manifold to provide a more or less normal and preferred path therethrough for raw water when the jacket contains its normal complement of circulating water and wherein the raw water path is disturbed to cause mixing of the raw water with the circulating water when that normal complement has diminished, as by dumping.

For example, Figures 5 and 6 show one from which a manifold may take wherein a structure provides the preferred path without the necessity of a tube. In this embodiment, raw water inlet 28 and raw water outlet 48 are oppositely disposed each other but in a relatively close spatial relationship to provide a gap, similar to that between inlet 28 and tube inlet 52 shown in FIG. 3, without a tube per se. They are located in a raised upper portion 58 of manifold jacket 18. The other inlet and outlet pair 30 and 34 are located as before in opposite end portions of the jacket. Exhaust conduit 56 is centrally located therein as is usual. When the jacket is substantially full of circulating water, that is to a level just below inlet 28 and outlet 48, raw water will flow between inlet 28 and outlet 48 with very little mixing.

However, when the water level drops in the jacket proper, as by thermostatic dumping, water entering inlet 28 will fall into the jacket proper until the level thereof is restored as previously described.

Similarly, another embodiment is shown in FIG. 7 which comprises an ordinary water jacketed manifold 18 with the closely spaced raw water inlet 28 and outlet 48 provided as required by this invention. The operation thereof requires no further explanation in view of that already presented in connection with the other Figures.

The preferred embodiment wherein a tube is used for the flow of raw water through the length of the manifold jacket has the added advantage, when the tube is a good heat exchange material, such as copper, brass or stainless steel, of establishing a desirable heat exhange relationship between the raw water flowing therethrough the circulating water in the jacket proper.

Having described the invention an exclusive property right is claimed according to the following:

1. A water jacketed marine engine manifold comprising:
   a central conduit for carrying exhaust gases from the engine;
   a water jacket surrounding the central conduit;
   a water inlet and outlet pair in the jacket adapted to be connected to an engine cooling system for circulating water through the jacket;
   another water inlet and outlet pair in the jacket for providing a flow of raw water therethrough, the inlet and outlet being closely disposed relative to each other and in a higher position in the jacket then the first mentioned pair.

2. The manifold according to claim 1 wherein:
   the raw water inlet is substantially at one end of the jacket and the raw water outlet is provided by the open end of a horizontally disposed tube in the jacket;
   the open end thereof being disposed relatively close to the raw water inlet, the opposite end of the tube being connected to an outlet opening at the substantially opposite end of the jacket whereby alternate paths for water entering the raw water inlet are established, the first path being through the tube, the second path being through the jacket proper.

3. The manifold according to claim 2 wherein:
   the tube is made of a heat exchange material to promote heat exchange between the cool water flowing therethrough and the heated water in the jacket.

* * * * *